United States Patent [19]
Wyers

[11] Patent Number: 5,377,885
[45] Date of Patent: Jan. 3, 1995

[54] DETACHABLE LEVER ACTION ARTICLE CARRIER

[75] Inventor: Philip W. Wyers, Englewood, Colo.

[73] Assignee: Bard-Wyers Company, Denver, Colo.

[21] Appl. No.: 178,425

[22] Filed: Jan. 7, 1994

Related U.S. Application Data

[63] Continuation of Ser. No. 809,970, Dec. 18, 1991, abandoned.

[51] Int. Cl.$^5$ .............................................. B60R 9/00
[52] U.S. Cl. .................. 224/42.03 R; 224/42.03 B; 224/314; 224/329
[58] Field of Search ............ 224/42.03 B, 42.03 R, 224/314, 321, 329, 331

[56] References Cited

U.S. PATENT DOCUMENTS

| | | | |
|---|---|---|---|
| 3,841,544 | 10/1974 | Berger | 224/42.03 B |
| 4,318,501 | 3/1982 | Graber | 224/42.03 B |
| 4,336,897 | 6/1982 | Luck | 224/42.03 B |
| 4,513,897 | 4/1985 | Graber . | |
| 4,709,840 | 12/1987 | Allen | 224/42.03 B |
| 4,830,250 | 5/1989 | Newbold et al. | 224/314 |
| 4,863,080 | 9/1989 | Graber | 224/42.03 B |
| 4,997,116 | 3/1991 | Grim | 224/42.03 B |
| 5,004,133 | 4/1991 | Wyers . | |
| 5,135,145 | 8/1992 | Hannes et al. | 224/42.03 B |

FOREIGN PATENT DOCUMENTS

| | | | |
|---|---|---|---|
| 8001895 | 9/1980 | WIPO | 224/42.03 B |

OTHER PUBLICATIONS

Assembly and Mounting Instrustions No. 1076 Bumper Mount BAC-RAC.

*Primary Examiner*—Linda J. Sholl
*Attorney, Agent, or Firm*—Fields, Lewis, Pittenger & Rost

[57] ABSTRACT

A detachable carrier for mounting articles such as bicycles to a motor vehicle is disclosed. The carrier disclosed includes a frame with laterally spaced side portions and a lower offset portion that rests on a surface of the carrying vehicle. This surface is either a horizontal surface or a horizontal and vertical surface provided by the bumper either at the front or the rear of a motor vehicle. The lower end portions of the offset portions form a fulcrum with the support surface of the vehicle about which the frame will turn in a lever action. A lower pair of laterally spaced fastening straps with appropriate end fasteners secure a lower portion of the frame to the vehicle and an upper pair of laterally spaced fastening straps with appropriate end fasteners secure an upper part of the frame to the vehicle. An article support on a pivotal hub assembly extends out from the sides of the frame in an extended position and is folded to a down position between the side portions of the frame when not in use. A locking arrangement allows the support arms to be locked at any angular position and between the extended and retracted positions.

17 Claims, 3 Drawing Sheets

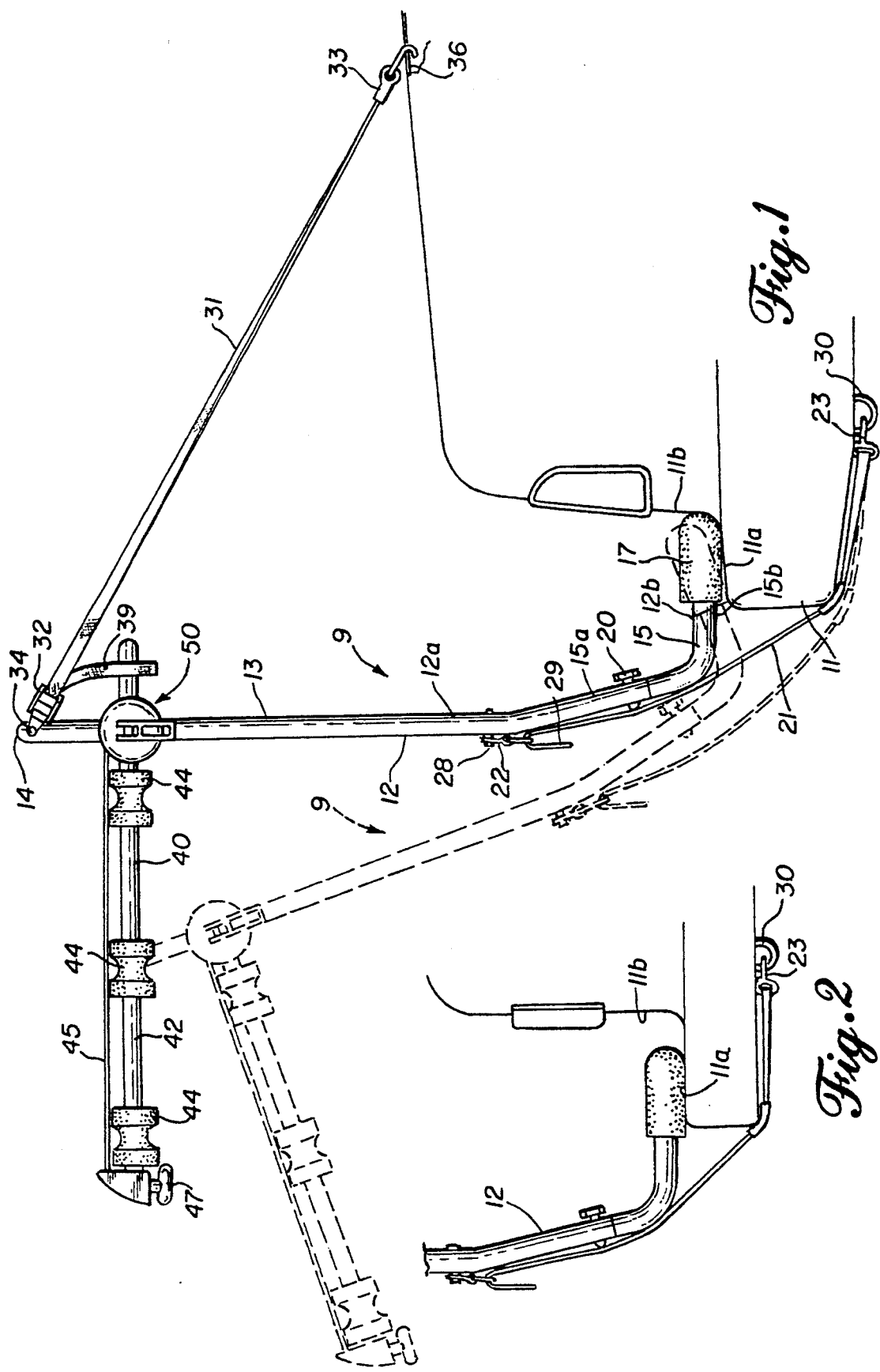

1

DETACHABLE LEVER ACTION ARTICLE CARRIER

This application is a continuation, of application Ser. No. 809,970, filed Dec. 18, 1991 now abandoned.

TECHNICAL FIELD

This invention relates generally to carriers for transporting articles on a vehicle and more particularly to a novel and improved detachable carrier for carrying one or more articles such as bicycles on a vehicle.

BACKGROUND ART

A variety of article carriers have heretofore been provided for mounting on vehicles to enable articles such as bicycles be carried on a vehicle to increase the carrying capacity of the vehicle.

U.S. Pat. No. 5,004,133 there is disclosed a bicycle carrier attached to the trailer hitch of a vehicle.

U.S. Pat. No. 4,513,897 discloses a carrier with a pair of pivotal feet that will rotate about respective axes to positions at right angles to one another to engage the top and rear side of the bumper of a vehicle with the frame extending to a position substantially below the bumper. A commercial form of this device referred to as a BAC-RAC sold by Graber Products Inc. requires three sets of fastening straps to secure the frame to a bumper.

DISCLOSURE OF THE INVENTION

A detachable carrier for articles such as bicycles includes a frame having laterally spaced side portions and laterally spaced offset portions forming lower extensions of the side portions. Top and bottom cross portions connect the side portions together. The lower end portions of the offset portions form a fulcrum with a support surface of a vehicle about which the frame will turn in a lever action during the positioning, fastening and transport of the carrier, A first pair of laterally spaced fastening straps secured to a lower portion of the frame extend to vehicle fastening structure below the bumper of a vehicle to pull the frame in one direction with respect to the fulcrum and a second pair of laterally spaced fastening straps secured at an upper position to side portions extend to vehicle fastening structure above the bumper such as the trunk lid to pull the frame in an opposite direction with respect to the fulcrum, An article support extends out from the side portions in an extended position and one or more articles such as bicycles are carried on the article support, The article support is pivotally mounted to the frame with a hub assembly on each side that allows the article support to be moved to a folded position extending along the inside of the side portions when not in use, A locking arrangement enables the locking of the article support at either the extended or folded positions and at any angular position therebetween,

BRIEF DESCRIPTION OF THE DRAWINGS

Details of this invention are described in connection with the accompanying drawings which like parts bear similar reference numerals in which:

FIG. 1 is a side elevational view of a carrier embodying features of the present invention shown mounted on the rear bumper of a motor vehicle with the article support arms shown in an extended position with a rearwardly tilted position for the carrier shown in dashed lines, FIG. 2 is a side elevational view similar to FIG. 1 with the bottom of the carrier frame disposed on the horizontal support surface of a deeper bumper.

DETAILED DESCRIPTION

Figure 3:
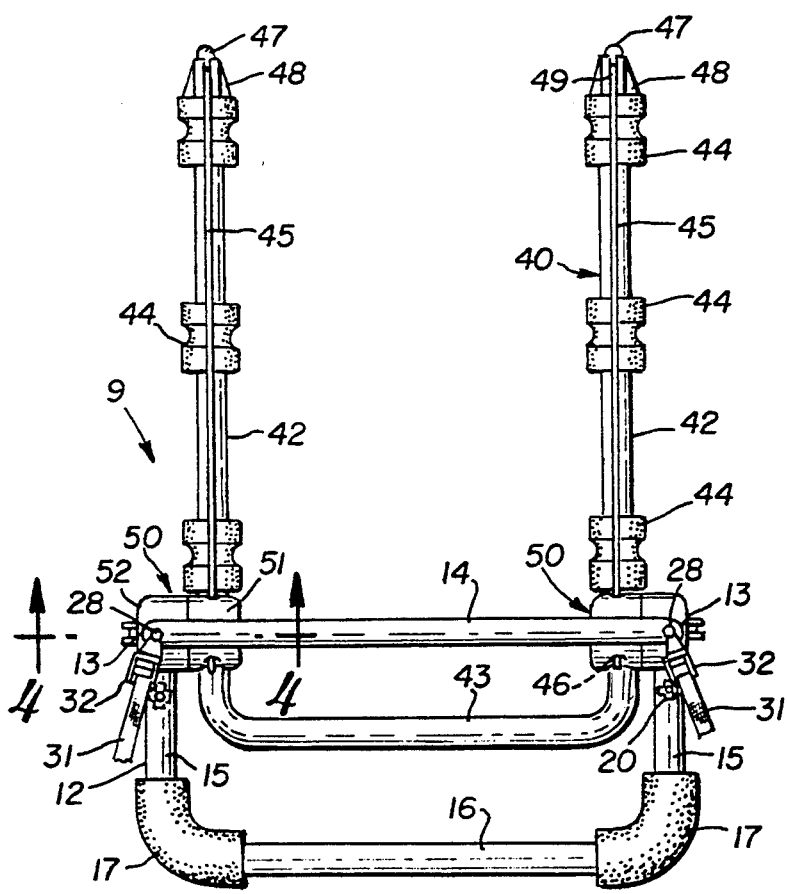
FIG. 3 is a top plan view of the carrier of FIG. 1.

Referring now to the drawing, there is shown a carrier 9 embodying features of the present invention, in an operative position on the rear bumper 11 of a motor vehicle shown as an automobile. The carrier 9 shown includes a frame 12 having a pair of laterally spaced side portions 13 arranged parallel to one another and a top cross portion 14 connecting to the upper extremities of the side portions 13. A pair of laterally spaced lower offset portions 15 connect to and extend down from the lower ends of the side portions and a bottom cross portion 16 is connected to the extremities of the offset portions and is arranged substantially parallel to the top cross portion.

The frame 12 shown is an open, four-sided, endless configuration that is rounded or curved at the corner connections at each of the top, side, offset and bottom portions and is formed of rigid metal tubing of circular cross section. The extremities of the offset portion 15 and the bottom portion 16 is offset a selected distance beyond the plane of the frame side portions 13. As seen in the side elevation the offset from the plane of the frame side portions 13 is accomplished by providing an upper inclined section 15a that is disposed at a slight angle to the associated side portion 13 and a lower transverse section 15b that is perpendicular to the associated frame side portion 13. It is understood that the frame side portion 13 could be extended in a straight line and connected to the lower transverse section 15b in an L-shaped configuration.

A tubular pad 17 of sponge rubber or like resilient material is mounted at the corners of the offset portions 15 and bottom portion 16 and extends a short distance along each of the portions 15 and 16 to rest on and bear directly against the support surfaces of a carrying vehicle. As shown on bumper 11 support surface 11a is a horizontal surface and a surface 11b is a vertical surface and together they form a corner with the pads 17 shown as butting against the corner and engaging both surfaces 11a and 11b.

While both the top portion 14 and bottom portion 16 serve as cross portions to connect the upper and lower extremities of the frame side and offset portions together, it is understood that a single cross connector between the upper and lower extremities of the side portions may be used. In this case only the lower extremities of the offset portions 15 would seat on the supporting surfaces of the vehicle.

Figure 8:
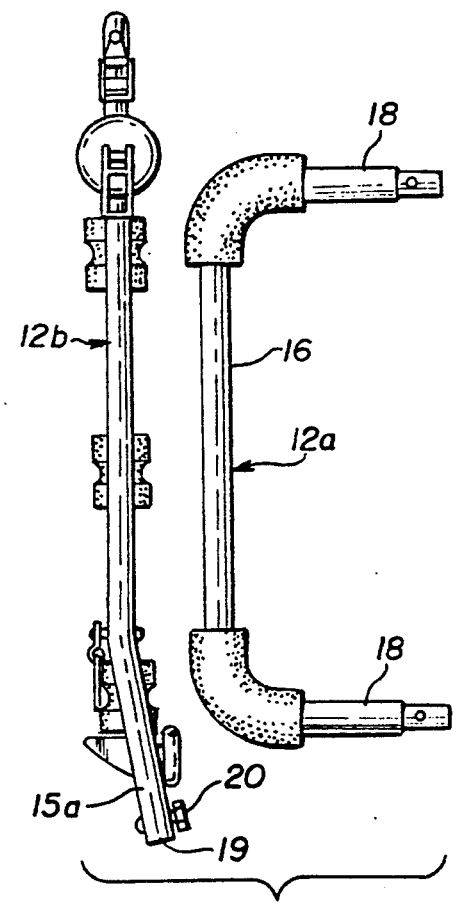
FIG. 8 is a side elevational view of the carrier of FIG. 1 in a folded up position with a lower frame section detached from the upper frame section.

A lower section 12a of the frame which is comprised of a part of the inclined section 15a, section 15b and the bottom cross portion 16 preferably is made detachable from an upper section 12b as seen in FIG. 8. The lower section 12a has end portions 18 that telescope into open end portions 19 of the upper side portions 13 of upper section 12b. A fastening bolt assembly 20 extends through holes in portions 18 and 19 at both sides of the frame and releasably locks the sections 12a and 12b together. A removal of the bolt fasteners 20 allows the sections to be separated. It is understood that the frame 12 could be made as an integral one-piece tube instead of the two telescoping sections as shown.

A lower fastening arrangement includes a pair of laterally spaced, adjustable length lower straps 21. Each lower strap 21 has one end fastened to a lower part of the frame side portion 13 and the other end fastened to available vehicle fastening structure typically under the vehicle. The available fastening structure shown in FIG. 1 is an eyelet 30. In particular, a locking buckle 22 is mounted at one end of the lower strap and a fastening hook 23 is fastened to the other end that loops into eyelet 30. Another possible available vehicle fastening structure is the inside lip of the bumper. The locking buckle 22 shown in more detail in FIG. 8 has opposed side portions 24, opposed end portions 25, a slot 26 and a locking lever 27. One end portion 25 of the buckle is fastened to the frame side portion by a bolt and nut fastener 28. One end portion of the strap threads through the slot 26 and the free end portion 29 of the strap 21 that extends past the buckle 22 is gripped by the user and the locking lever 27 selectively grips the strap end portion 29 to change the length of the strap and thereby the tension on the strap to firmly fasten the frame 12 to the vehicle.

An upper fastening arrangement includes a pair of laterally spaced adjustable length upper straps 31. Each upper strap 31 has one end fastened to an upper part of one of the frame side portions 13 or the top cross portion 14 adjacent the frame side portion and the other end fastened to vehicle fastening structure typically the rear of the trunk lid 36 as shown. In particular, a locking buckle 32 identical in construction to buckle 22 above described is mounted at one end of the upper strap and a fastening hook 33 is fastened to the other end. One end portion of the buckle 32 is fastened at the corner of the frame side portion 13 and top cross portion 14 by a bolt and nut fastener 34. The strap 31 threads through the slot in the buckle 32 and has a free end portion 39. The free end portion 39 is pulled to draw strap 31 taut.

An article support 40 is pivotally mounted at opposite sides to the inside of the frame side portions 13. The article support 40 includes a pair of laterally spaced support arms 42 extending out from the side portions in an extended position on which one or more articles to be carried, such as bicycles, are supported. The support arms 42 shown are connected by an intermediate bight arm 43 to form a U-shaped configuration for support 40. This support 40 is also formed of a one-piece, metal tubular body of circular cross section shown as the same diameter as frame side portion 13 and rounded at the corner connections between the side arms and bight arm. Each support arm 42 has three resilient saddle supports 44 spaced along the length thereof arranged with three aligned pairs of saddle supports that provide a cradle support for three bicycles side by side. Flexible hold down cords or lines 45 are provided for each support arm. One end of each flexible cord 45 extends through the offset hole 63 in the inner hub 51 and is fastened to the hub as by using a knot 46 in the end larger than hole 63 (FIG. 3). The other end has a T-shaped handle 47. An end cap 48 at the outer end of each support arm 42 has a V-shaped slot 49 to releasably secure and hold the handle 47. Typically after the bicycle is positioned on the pairs of supports 44 the cord 45 is twisted around the bicycle and the associated support arm and the handle 47 is inserted into the slot 49 to fasten the bicycle to the support 40.

The pivotal mounting for the article support 40 to the frame 12 includes a similar hub assembly 50 on opposite sides of the frame. Each hub assembly 50 includes a set of opposed inside and outside clamping hubs 51 and 52, respectively. The outside clamping hub 52 fastens to frame support portion 13 and the inside clamping hub 51 fastens to support arm 42. The outside clamping hub is similar in construction to the inside clamping hub so that a description of one generally applies to both. Each clamping hub includes a cylindrical, cup-like, hollow outer body 54 and a circular inner body 55 that nests in the outer body and is separable therefrom. The outer body 54 has a radial hole 56 of circular shape and sized to receive the circular frame support portion 13 for the outer hub and support arm 42 for the inner hub. A central axial hole 57 is sized to receive the pivot bolt 71. An inside arcuate section 59 is complementary in shape with the support structure and fits thereagainst and is clamped thereto by bolt 71. The outer end of the outer body of the outer hub 52 is provided with a keyhole shaped, flat recessed area 61 that is engaged by the cam surface of the lever arm 76 described hereinafter.

Figure 4:
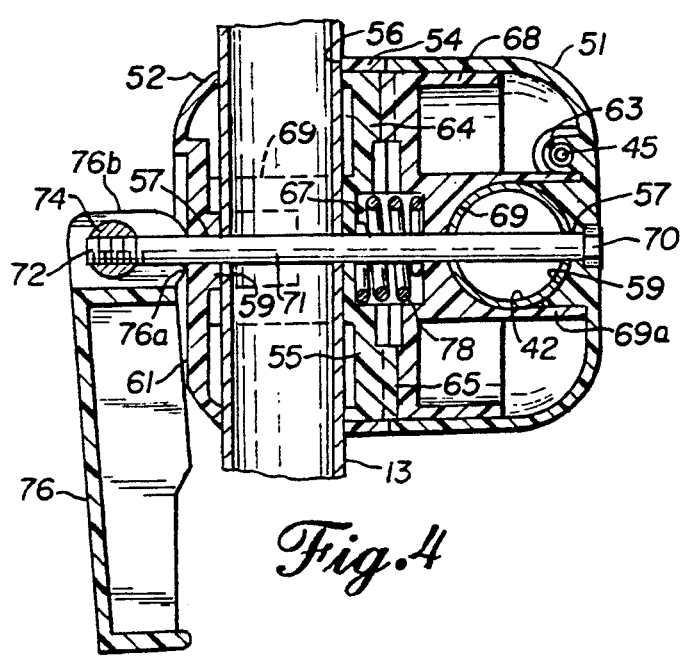
FIG. 4 is a sectional view taken along line 4—4 of FIG. 3 showing the pivotal mounting and locking assembly for each support arm shown in a locked position.
Figure 7:
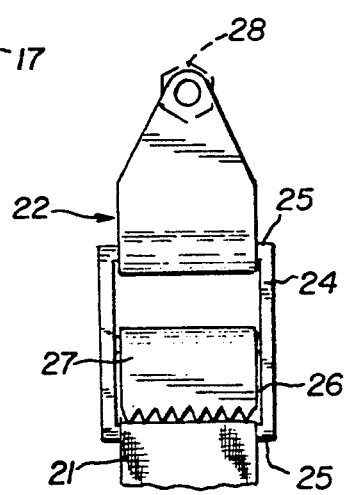
FIG. 7 is a plan view of the locking buckle shown in FIG. 1.

Each inner body 55 has a radially extending disc-shaped section 64 providing an inwardly facing friction face 65 formed with a plurality of circumferentially spaced V-shaped teeth 66, an inwardly facing central socket 67 for receiving one end of the tension spring 78. In the embodiment shown there are 36 teeth at 10 degree angles. The inner body 55 further has a cylindrical peripheral wall portion 68 that extends in from section 65 and telescopes in the outer body 54. Wall portion 68 has an arcuate section at opposite ends in alignment with holes 56 that fits against the support structure (13 or 42). An inside arcuate section 69 with opposed leg 69a is sized to receive the support structure 13 or 42 and clamps thereon. Legs 69a overlap section 59 as seen in FIG. 4. This prevents the inner body from rotating relative to the outer hub.

The inside clamping hub 51 is similar in construction to the outside clamping hub 52 above described but has a hexagonal radial hole 70 shaped to accommodate and hold against turning the hexagonal head of the pivot bolt 71 instead of the recessed area 61 to accommodate the lever arm. Further there is an offset hole 63 to receive the end of the cord 45.

Figure 5:
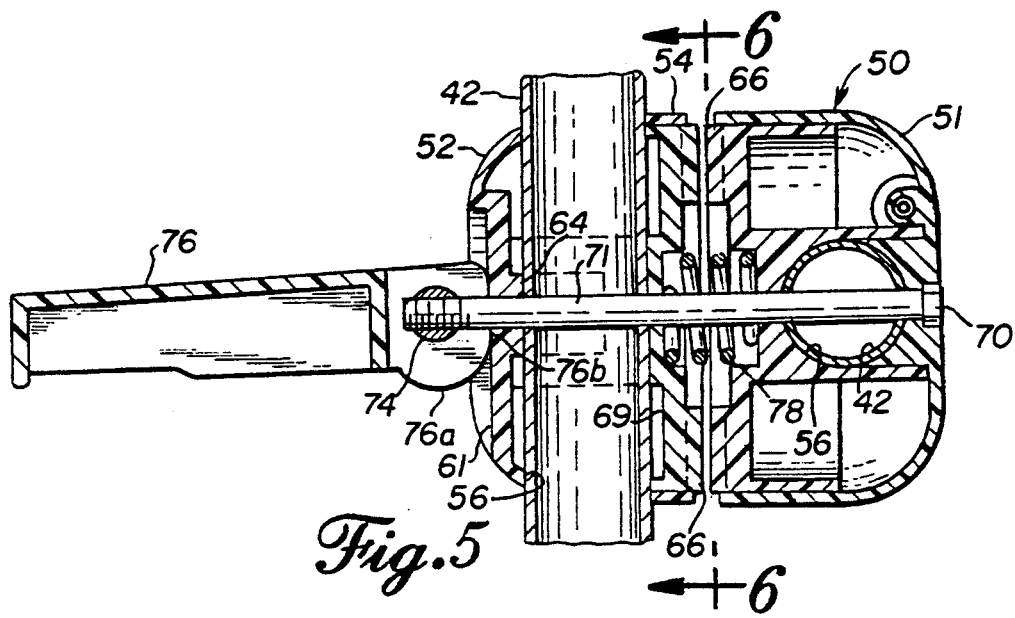
FIG. 5 is a sectional view similar to FIG. 4 shown in a released position.
Figure 6:
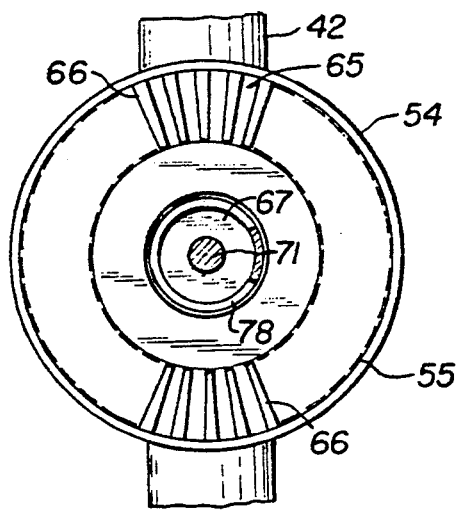
FIG. 6 is a sectional view taken along line 6—6 of FIG. 5 showing the circumferential teeth.

The pivot bolt 71 with threads 72 extends laterally through aligned holes in the above described clamping hubs 51 and 52 and a hole 73 in the side portion 13 and hole 75 in the support arm 42. A nut 74 on a cam lever 76 threads on the bolt 71. The cam lever 76 has an offset cam surface portion 76a along one side that is of greater diameter than the cam surface 76b at the end to provide the two positions for the hubs 51 and 52. A compression spring 78 is positioned in the central socket 67 between the opposed inner bodies to separate the hubs when the lever 76 is up. In the down position the cam portion of the lever arm brings the two faces together as shown in FIG. 4 and when the cam lever is raised the faces are apart as shown in FIG. 5. With the inner hub positioned against the support structure the teeth 66 on each face project beyond the inside edge of the associated outer body 54 to intermesh as shown in FIG. 4.

To mount the carrier to the vehicle, the lower end of the offset portions 15 seats on the top of the vehicle bumper 11. The upper straps 31 are first fastened to the vehicle fastening structure 36 and then the lower straps 21 are fastened to the vehicle fastening structure 30 to initially locate the frame side portions 13 in an upright position with a rearward tilt as shown in dashed lines in FIG. 1. The lower straps 31 are drawn taut with the rearward angle for the frame side portions 13 being about 20 degrees to the vertical. The upper straps 31 are then drawn taut to bring the frame side portions 13 to a vertical position.

The frame side portions 13 of the frame define a lever arm that turns in a lever action about a fulcrum substantially at the lower end of the offset portion 15 and along the bottom thereof. The frame is rotatable about that fulcrum to dispose the side portions at a selected angle to the vertical according to the settings of the length of each of the upper and lower fastening straps. After the frame has been attached, the support arms can then be raised by loosening the fastening assemblies and raising the support arm to a substantially horizontal extended position. The bicycles are then placed on the support arm in the saddle supports 44 and the flexible cords 45 are pulled and wrapped over the bicycles. Further flexible fasteners such as bungee cords may be used to further attach the bicycle to the frame.

The shape and top surface area of bumpers of current vehicles will vary. A typical bumper of average top surface depth is illustrated in FIG. 1. In this case the formed lower end of the offset portion will rest on the top surface and may also butt against an upright surface at the rear of the top surface. In a longer bumper as shown in FIG. 2 may be supported solely to a horizontal bumper surface. It is understood the above described carrier may be mounted to either the front or rear bumpers, etc. of a variety of vehicles which includes vans. In vans the upper straps would extend up rather than down from a horizontal position. Further it is noted the carrier does not interfere with the opening and closing of the trunk lid.

Although the present invention has been described with a certain degree of particularity, it is understood that the present disclosure has been made by way of example and that changes in details of structure may be made without departing from the spirit thereof.

What is claimed is:

1. An article carrier adapted for mounting to a vehicle comprising: frame means including
a pair of laterally spaced substantially straight side portions,
a cross portion connecting said side portions,
a pair of laterally spaced, offset portions rigidly connected to and extending from the lower extremities of said side portions and extending generally transverse to said side portions,
said offset portions being adapted to seat on a generally horizontal top support surface of a vehicle, said side portions and offset portions providing a lever arm that turns in a lever action about a fulcrum established at a contact area between a bottom forward surface of said offset portions and said top support surface about which said lever arm will rotate in either direction,
first fastening means attached to and extending from a lower portion of said side portions above said fulcrum to a lower fastening structure of the vehicle below said fulcrum to fasten the frame means to the vehicle to pull the frame means downwardly against said support surface and forwardly toward the vehicle to turn said frame means in one direction with respect to said fulcrum, said offset portions offsetting said side portions forming said lever arm a substantial distance rearwardly of an in-line position with said fulcrum to enable said first fastening means to provide said downward and forward pull on said side portions,
second fastening means attached to and extending from an upper portion of said frame means to an upper fastening structure of the vehicle above said fulcrum to releasably fasten the frame means to the vehicle above said fulcrum and pull said frame means toward the vehicle to turn said frame means in an opposite direction with respect to said fulcrum,
whereby said frame means disposed upright with a lower surface of said offset portions supported on said support surface is held in position by said first and second fastening means, and
article support means extending outwardly from said side portions in an extended position, said article support means being movable to a folded position.

2. A carrier as set forth in claim 1 wherein said frame means is formed as an upper section and a lower section, said sections telescoping together along opposite sides and being releasably fastened by fastening means to permit separation of said frame into two sections.

3. A carrier as set forth in claim 1 wherein each offset portion includes an upper portion disposed at a slight angle to the associated side portion and a lower portion extending substantially perpendicular to said side portion.

4. A carrier as set forth in claim 1 wherein said cross portion includes a top cross portion connected at the upper extremities of said side support portions and a bottom cross portion connected at the lower extremities of said offset portions to form a frame body having an open, four-sided, endless configuration with four rounded corners, said side, offset, top and bottom cross portions being formed of rigid, metal tubing.

5. A carrier as set forth in claim 1 including pad means at the corners connecting said offset portions and said bottom cross portion that bear directly against said support surface in moving about said fulcrum.

6. A carrier as set forth in claim 1 wherein said article support means includes a pair of laterally spaced support arms connected by an intermediate bight arm to form a U-shaped configuration with rounded corners that is sized to fit inside said side portions.

7. A carrier as set forth in claim 6 including a plurality of saddle supports disposed at spaced intervals on each of said support arms, said saddle supports being arranged as opposed sets to cradle a plurality of bicycles side by side on said support arms.

8. A carrier as set forth in claim 7 including a cord means attached at an inner end of each support arm and releasably fastened at an outer end of each support arm to releasably fasten the bicycles to said support arms.

9. A carrier as set forth in claim 1 including a pivotal mounting means for mounting said article support means for pivotal movement with respect to said frame means and locking means to lock said support means in said extended position, said folded position and at selected angular positions between said extended and folded positions.

10. A carrier as set forth in claim 9 wherein said pivotal mounting means includes a hub assembly mounted to each of said side portions and a side of said article support means, each said hub assembly including a set of inside and outside hubs, each of said inside and outside hubs having opposed friction faces that are selectively engaged and disengaged by said locking means.

11. A carrier as set forth in claim 10 wherein each of said hubs includes a hollow outer body and an inner body that nests in said outer body and is separable therefrom.

12. A carrier as set forth in claim 11 wherein each of said outer inner bodies has inside arcuate sections complimentary in shape with the associated supporting structure of either said side portions or article support means to which they are attached by said pivot bolt and are drawn against the associated support structure by said pivot bolt.

13. A carrier as set forth in claim 12 wherein each said pivot bolt extends through holes in an associated of each of said side portion and support arm.

14. A carrier as set forth in claim 10 wherein said each said locking means includes a pivot bolt with threads extending through each of said set of inside and outside hubs and a cam lever with a cam surface carried by a nut threaded on said bolt that turns to compress said opposed friction faces against one another to lock said inside and outside hubs together at selected angular positions.

15. A carrier as set forth in claim 14 wherein said opposed friction faces are formed with a plurality of circumferentially spaced teeth with opposing teeth intermeshing with one another to lock against relative rotary movement between said hubs in a locking position.

16. A carrier as set forth in claim 1 wherein each of said first and second fastening means includes a pair of straps each fastened at one end to said frame means and having a hook at the opposite end to releasably engage selected vehicle fastening structure, a locking buckle through which each strap extends to change the length between the ends of the strap and lock the strap at a selected length.

17. A detachable lever action carrier for bicycles adapted for mounting to a vehicle comprising: frame means including a pair of laterally spaced side portions arranged substantially parallel to one another, a top cross portion connected to the upper extremities of said side portion, a pair of laterally spaced, offset portions rigidly connected to and extending from the lower extremities of said side portions and extending generally transverse to said side portions, said offset portions displaying said side portions rearwardly of the rear of said vehicle, a bottom cross portion connected to the lower extremities of said offset portions and arranged substantially parallel to said top cross portion, said offset portions being adapted to seat on a substantially horizontal top support surface of a vehicle bumper, said side portions and offset portions defining a lever arm that turns in a lever action about a fulcrum established at a contact area between a bottom forward surface of said offset portions and said top support surface about which said lever arm will rotate in either direction, first adjustable length fastening means attached to and extending from a lower portion of said side portions above said fulcrum to a lower fastening structure of the vehicle below said fulcrum to fasten the frame means to the vehicle to pull the frame means in one direction downwardly against said support surface and forwardly toward the vehicle to turn said frame means in one direction with respect to said fulcrum, said offset portions offsetting said side portions forming said lever arm a substantial distance rearwardly of an in-line position with said fulcrum to enable said first fastening means to provide said downward and forward pull on said side portions, second adjustable length fastening means attached to and extending from an upper portion of said frame means to an upper fastening structure of the vehicle above said fulcrum to releasably fasten the frame means to the vehicle above said fulcrum to pull said frame means toward the vehicle to turn said frame means in a direction opposite to said first direction toward the vehicle with respect to said fulcrum, whereby said frame means disposed upright with the bottom of said offset portions supported on said support surface is held in position by said first and second fastening means and is disposed at a selected angle to the vertical according to the length settings of each of said first and second fastening means, and article support means including a pair of laterally spaced support arms extending rearwardly from said side portions in an extended article supporting position, said side arms being movable to a folded position.

* * * * *